United States Patent Office 3,812,061
Patented May 21, 1974

3,812,061
METHOD OF PREPARING ANION EXCHANGE RESINS WITH SULFURYL CHLORIDE
James H. Barrett, Cornwells Heights, Pa., assignor to Rohm and Haas Company, Philadelphia, Pa.
No Drawing. Filed Apr. 27, 1972, Ser. No. 248,150
Int. Cl. C08f 27/03
U.S. Cl. 260—2.1 E          15 Claims

ABSTRACT OF THE DISCLOSURE

A novel method of preparing anion exchange resins is presented which utilizes the chlorination of vinyl aromatic polymers having pendant methyl groups, e.g., cross-linked poly(vinyltoluene). Sulfuryl chloride is used as the chlorinating agent in the presence of a free radical catalyst. Reaction is highly selective and only trace amounts of ring halogenation are observed.

---

This invention relates to the preparation of anion exchange resins. The novel process or method utilizes the chlorination of a vinyl aromatic polymer having at least one pendant methyl group, e.g., poly(vinyltoluene). Sulfuryl chloride or other equivalent material is used as a chlorinating agent, and the chlorination is carried out in the presence of a free-radical catalyst. The chlorination reaction, as more fully described hereinafter, is highly selective, and only trace amounts of ring halogenation are observed.

It is, of course, well known in the field of resin chemistry generally, and ion exchange chemistry particularly, that chloro methylated materials are readily prepared, and indeed have most commonly been prepared in the past, by the chloromethylation of an appropriate aromatic polymer with chloromethylation of an appropriate aromatic polymer with chloromethyl methyl ether (CME) and/or bis-chloromethyl ether (bis-CME) which is most usually present as a minor constituent or contaminant with the CME, in the presence of a Lewis acid catalyst. When this reaction is performed utilizing the styrene divinyl benzene crosslinked copolymer, for example, as substrate, a secondary reaction takes place. This involves further reaction of the initially formed benzyl chloride groups to give secondary crosslinking (through a methylene group) as shown below.

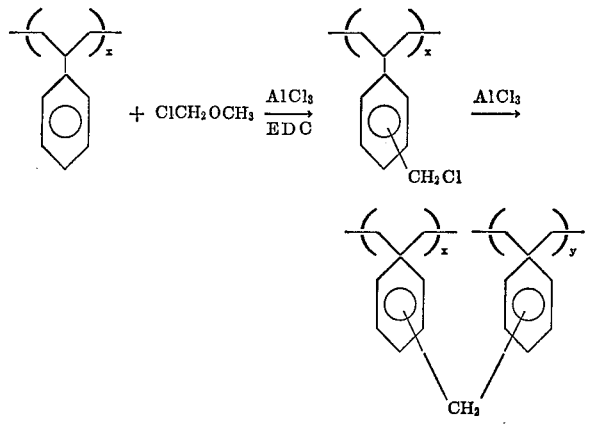

The present invention involves a technique which produces materials, especially ion exchange materials, which do not have the secondary crosslinking commonly present in the prior art polymers. These novel ion exchange materials, having little or no secondary crosslinking, can be prepared by chlorinating the pendant methyl groups of the suitable aromatic polymer, for example, poly(vinyltoluene), using sulfuryl chloride in the presence of a free-radical catalyst. In the present case there is no material or catalyst present which causes or allows the benzyl chloride functionality to react further. The reaction is very selective, and only trace amounts of ring halogenation are observed. This is in contrast to results obtained when the same substrate copolymer is chlorinated with molecular chlorine in the presence of light or a free-radical catalyst. In the latter case, appreciable amounts of ring chlorinated material are formed, and such ring chlorination would be an undesirable component in ion exchange resins.

The present invention also avoids toxicity problems associated with the use of CME and/or bis-CME.

More particularly, the method of the present invention involves decomposing a free-radical catalyst in the presence of sulfuryl chloride and the appropriate substrate polymer. It is important that the substrate polymer have a pendant methyl group, and typical substrate polymers include, for example, mono- and poly-alkyl styrene such as poly(vinyltoluene) and poly(vinylxylene). These substrates are preferably crosslinked with a suitable crosslinking agent. The crosslinking agent is usually present in a minor proportion and comprises a polyethylenically unsaturated material which is preferably divinylbenzene, or a substituted divinylbenzene such as trivinylbenzene, divinyltoluene, divinylxylene, divinyl ethyl benzene, etc. Other crosslinking agents which can also be used are divinylether, ethylene glycol dimethacrylate, ethylene glycol diacrylate, trimethylolpropane trimethacrylate, diallyl maleate, a polyester of a polyhydric alcohol and an olefinically unsaturated carboxylic acid, such as, for example, ethylene glycol and maleic anhydride. These substrate copolymers, as well as the finished or resulting polymer, including the ion exchange polymers, can have either a gel structure or a sponge or macroreticular structure. These structures are well known to the art. The amount of crosslinking agent may vary within wide limits, but ordinarily it will be used in an amount of about one-half to about 40% by weight, preferably in an amount of about 1–30% by weight, and more preferably about 3 to about 25 percent by weight, based on the total weight of the monomers forming the copolymer—i.e., both the aromatic vinyl and crosslinking monomer in the copolymer. Optionally, the crosslinker can be omitted entirely and a linear polymer can be prepared according to the teachings of the present invention, i.e., by using sulfuryl chloride as the chlorinating agent to introduce chloromethyl groups into a linear vinyl aromatic polymer having a pendant methyl group. The linear polymer can thereafter be aminated to produce products having useful properties such as flocculents, sizing agents for paper, textiles, ion-exchange properties, etc.

The chlorination reaction is most readily carried out in the presence of a solvent such as benzene, chlorobenzene, carbon tetrachloride, methylene chloride, etc., or any other solvent which does not react appreciably with sulfuryl chloride and thus lower the reaction yield. In the case of crosslinked copolymers, the solvent need only be a swelling solvent for the copolymer. In some instances, sulfuryl chloride may be used by itself as the swelling agent. The proportion of sulfuryl chloride used, in terms of moles of sulfuryl chloride per mole of substrate polymer or copolymer to be chlorinated, may vary over a wide range, but generally it will be in the range of about 1–3 moles per mole of polymer.

The catalysts which are used or employed may include any of the common free-radical initiators or catalysts which exhibit appreciable decomposition rates at the temperature chosen for the reaction (generally below 100° C.). Examples of suitable catalysts or initiators are benzoid peroxide, lauroyl peroxide, axobisbutyronitrile, etc. The temperature range for the chlorination reaction can also vary over a very wide range, but generally it will be in the range of about 20–150° C., and more preferably from about 40–80° C.

It has also been found that the reaction can be performed using various reaction sequences. Thus, for example, the polymer, solvent, sulfuryl chloride, and catalyst can be mixed at one time and allowed to react, with good results. In other cases the sulfuryl chloride or the catalyst or both may be added directly to the solvent-polymer mixture in a gradual manner throughout the course of the reaction.

Excellent yields of chloromethylated polymers prepared according to the present invention are obtained when an excess of sulfuryl chloride per increment of polymer is used. Preferably, this excess will be about 10 mole percent of sulfuryl chloride per equivalent of polymer. In some cases larger excesses of sulfuryl chloride are desirable for maximum yield. An optional feature involves the addition of bromine to the chlorinating mixture to give outstanding yields.

In the examples below, and throughout the specification and claims, all parts and percentages are by weight unless otherwise stated.

EXAMPLE I (A) Chlorination (Cl$_2$) of a poly(vinyltoluene)-1.85% divinylbenzene copolymer A 120 g. sample (~1.0 mole) of a divinylbenzene (1.85%) crosslinked poly(vinyltoluene) copolymer (balance is vinyltoluene here and hereinafter unless otherwise mentioned) prepared by a standard pearl polymerization technique is charged to a two liter 3-necked Pyrex flask equipped with a gas inlet tube, a Dry Ice condenser and a stirrer. The beads are swollen in carbontetrachloride (CCl$_4$) at room temperature for 1 hour and 0.3 cc. of phosphorus trichloride is added. The resulting mixture is heated to 65° and 110 g. (~1.5 moles) of chlorine gas is added over 70 minutes while irradiating the mixture with a 140 watt Hanovia U.V. lamp. Upon completion of the addition the mixture is irradiated for an additional 30 minutes, the mixture is cooled, the solvent is removed by filtration, and the polymer is air dried after washing with 3× 500 ml. of anhydrous methanol. Analysis: 37.4% chlorine. Theory for 100% chlorine on the pendant methyl groups—23.1%.

(B) The above experiment is performed using 1 mole of chlorine per equivalent of poly(vinyltoluene) copolymer. Analysis: 31.2% chlorine.

(C) The polymer from part (A) 930 g. is swollen in 200 g. of 1,2 dichloroethane (EDC) for 20 minutes and the excess EDC is removed. Aqueous trimethylamine (TMA) is added (250 ml., 15%) and the temperature is held at 15° for 1 hour. The resulting mixture is stirred at room temperature for 16 hours and the EDC and excess TMA are removed by steam distillation. The resulting resin had an anion exchange capacity of 3.2 meq./g. of dry resin.

EXAMPLE II (A) Halogenation of poly(vinyltoluene-1.85% divinylbenzene copolymer with sulfuryl chloride-bromine mixture A 59.25 g. (0.5 M[1]) sample of divinylbenzene (1.85%) crosslinked vinyltoluene copolymer is added to a 4 l., 3-necked flask equipped with a gas inlet tube, a stirrer, a condenser to which is attached a gas trap, and a dropping tube. Benzene is added to the beads until a stirrable slurry is obtained. The mixture is cooled to ~5° and 135 g. (1.0 M) of sulfuryl chloride and 4.0 g. of lauroyl peroxide was added. The resulting mixture is stirred at 5–7° for 30 minutes and was warmed to 60°.

To the mixture is added 15 g. (~.1 M) of bromine and 4.0 g. of lauroyl peroxide in 50 ml. of benzene over a 4 hour period. The mixture is heated to reflux and when the temperature reaches 80° the reaction mixture is quenched into ice cold methanol. The resulting polymer was washed with 3× 500 ml. of methanol and was dried in a steam oven. Analysis: 2.7 Cl; 16.4% Br.

(B) Aminolysis of the halomethylated polymer

The polymer described above is aminolyzed in the standard manner to give a strong base ion exchange resin having an anion exchange capacity of 4.17 meq./g. of dry resin.

EXAMPLE III (A) Halogenation of poly(vinyltoluene)-6% divinylbenzene copolymer with sulfuryl chloride A vinyltoluene copolymer, crosslinked with about 6% divinylbenzene (59.25 g., 0.5 M) is slurried in benzene under a nitrogen atmosphere for 20 minutes in the presence of 0.8 g. of azobisisobutyronitrile (AIBN). The mixture is warmed to 60° and 101.2 g. (0.75 M) of sulfuryl chloride and 1.2 g. of AIBN in 50 ml. of benzene are added dropwise over 3 hr. and 20 minutes. The resulting mixture is held at 60° for an additional 2.5 hours and is cooled to room temperature and quenched in cold methanol. The resulting polymer is washed with 2× 400 ml. of absolute methanol. Analysis: 27.9% Cl.

(B) Aminolysis of the chloromethylated copolymer

The above intermediate is dried and the dried sample is swollen in EDC. Aminolysis with an excess of 25% aqueous TMA yielded a strong base ion exchange resin having a capacity of 3.51 meq./g. of dry resin.

EXAMPLE IV (A) Halogenation of poly(vinyltoluene)-1.85% DVB (divinylbenzene) copolymer with sulfuryl chloride To a mixture of a 59.3 g. of copolymer comprising a 1.85% DVB crosslinked poly(vinyltoluene), 372 g. of chlorobenzene, and 4.0 g. of Percodox-16 was added 101.2 g. of sulfuryl chloride in one portion at 0° C. The resulting mixture is stirred for 1 hour and the mixture is warmed to 50° C. Percodox-16 (4.0 g.) in 25 ml. of chlorobenzene is added over 4 hours and the reaction mixture is quenched in ice-methanol, washed with methanol, and dried in a steam oven. Analysis: 22.1% Cl.

(B) The above intermediate was swollen in EDC and was aminolyzed at room temperature with an excess of 25% aqueous TMA. A strong base ion exchange resin is formed which has an anion exchange capacity of 3.2 meq./g. of dry polymer.

EXAMPLE V (A) Chlorination of linear poly(vinyltoluene) with sulfuryl chloride A sample of linear poly(vinyltoluene), 59.25 g. (0.5 M), was dissolved in 250 ml. of carbontetrachloride. AIBN[2] (0.8 g.) is added when solution is complete and the solution is stirred for 15 minutes. The solution is warmed to 60° and 74.3 g. (0.55 M) of sulfuryl chloride and 1.8 g. of AIBN in 50 ml. of carbontetrachloride were added in 2 hours 20 minutes. The resulting solution is cooled to 30° and is slowly added to 2 l. of anhydrous methanol. The resulting precipitated polymer is purified by redissolving in carbontetrachloride and reprecipitating in methanol three times. The chloromethylated polymer contained 20.2% Cl.

---
[1] Mole.
[2] Azo-isobutyronitrile.

(B) Aminolysis of linear chloromethylated poly(vinyltoluene) with aqueous trimethylamine A sample of the above intermediate is aminolyzed with an excess of aqueous TMA (25%) at room temperature for 24 hours. The excess amine is removed by steam distillation. The solid obtained by evaporation of the water contained 5.9% nitrogen and had an anion exchange capacity of 4.2 meq./g. of dry polymer.

EXAMPLE VI (A) Chlorination of linear poly(vinyltoluene) with chlorine

Linear poly(vinyltoluene), 59.0 g. (0.5 M), is dissolved in 400 ml. of carbontetrachloride at room temperature. The solution is warmed to 65° and 0.3 cc. of $PCl_3$ is introduced. Chlorine gas (36.0 g.) is added over a period of 40 minutes while irradiating the mixture with a 140 watt Hanovia mercury lamp. Upon completion of the addition the mixture is irradiated for an additional hour. The material is purified by precipitation in methanol followed by 2× 1 l. washes with methanol. Analysis: 23.5% Cl.

(B) Aminolysis of the intermediate described in part (A), above, using the technique previously described gives a polymer having an anion exchange capacity of 3.3 meq./g. of dry resin.

EXAMPLE VII (A) Halogenation of poly(vinyltoluene)-3% divinylbenzene-6% monomer trimethylolpropane trimethacrylate copolymer with sulfuryl chloride A slurry of 198.2 g. (~1.5 M) of copolymer, 550 ml. of chlorobenzene, 2nd 3.2 g. of azobisisobutyronitrile (AIBN) is warmed to 70° with stirring under a nitrogen atmosphere. To the stirred mixture is added 162 ml. (~2.0 M) of sulfuryl chloride and 4.8 g. of AIBN dissolved in 65 ml. of benzene and 25 ml. of chlorobenzene over a period of three hours. The excess sulfuryl chloride is removed under vacuum and the resulting intermediate is washed and slurried in water. Analysis of dried intermediate: 22.6% Cl.

(B) Aminolysis

The above slurry is cooled to ~0° C. and 120 g. (~2.0 M) of anhydrous trimethyl amine (TMA) is added over a two hour period. The temperature is allowed to increase to 27° while the mixture is stirred for an additional four hours. The organic swelling solvent is removed by distillation while water is added to maintain fluidity. The product had an anion exchange capacity of 2.74 meq./g. of dry copolymer (solids—46.9%).

The following Table I summarizes the properties of ion exchange resins prepared according to the present invention.

ing pendant methyl groups, the improvement which comprises performing the chlorination with an excess of sulfuryl chloride in the presence of a free radical catalyst at a temperature in the range of about 5° C. to about 80° C., thereby chlorinating and converting said pendant methyl groups into chloromethyl groups.

2. The process of claim 1 wherein the chlorination reaction is carried out in the presence of a solvent.

3. The process of claim 2 wherein the solvent is is selected from the group consisting of benzene, chlorobenzene, carbon tetrachloride, and methylene chloride.

4. The process of claim 1 wherein the chlorination reaction is carried out in the presence of bromine.

5. The process of claim 1 wherein the vinyl aromatic polymer is crosslinked with divinylbenzene.

6. The process of claim 1 wherein the vinyl aromatic polymer is crosslinked with trimethylolpropane trimethacrylate.

7. In the process of chlorinating the pendant methyl groups of crosslinked poly(vinyltoluene) or poly (vinylxylene), the improvement which comprises performing the chlorination with an excess of sulfuryl chloride in the presence of a free radical catalyst at a temperature in the range of about 5° C. to about 80° C., thereby chlorinating and converting said pendant methyl groups into chloromethyl groups.

8. The process of claim 7 wherein the chlorination reaction is carried out in the presence of a solvent.

9. The process of claim 8 wherein the solvent is selected from the group consisting of benzene, chlorobenzene, carbon tetrachloride, and methylene chloride.

10. The process of claim 7 wherein the chlorination reaction is carried out in the presence of bromine.

11. The process of claim 7 wherein the poly(vinyltoluene) or poly (vinylxylene) is crosslinked with divinylbenzene.

12. The process of claim 6 wherein the poly(vinyltoluene) or poly (vinylxylene) is crosslinked with trimethylolpropane trimethacrylate.

13. In a process of preparing anion exchange resins which comprises (A) chlorinating the pendant methyl groups of a crosslinked vinyl aromatic polymer containing pendant methyl groups and (B) aminating the product of step (A), the improvement which comprises performing the chlorination with an excess of sulfuryl chloride in the presence of a free radical catalyst at a temperature in the range of about 5° C. to about 80° C., thereby chlorinating and converting said pendant methyl groups into chloromethyl groups.

14. In the process of chlorinating the pendant methyl groups of a linear vinyl aromatic polymer containing pendant methyl groups, the improvement which comprises performing the chlorination with an excess of sulfuryl chloride in the presence of a free radical catalyst at a temperature in the range of about 5° C. to about 80° C., thereby chlorinating and converting said pendant methyl groups into chloromethyl groups.

TABLE I.—RESIN REACTION CONDITIONS AND PROPERTIES

| Polymer | Equiv. | Divinylbenzene in polymer, percent | Reactant, M | Catalyst | Solvent | Anion exchange capacity, meq./g. | Added reactants, M |
|---|---|---|---|---|---|---|---|
| Poly(vinyltoluene) | 0.5 | 6 | $SO_2Cl_2$, 0.75 | AIBN | Benzene | 3.51 | |
| Do | 0.5 | 1.85 | $SO_2Cl_2$, 1.0 | Lauryl peroxide | do | 4.17 | $Br_2$, 0.1 |
| Do | 0.5 | 1.85 | $SO_2Cl_2$, 0.75 | Dicyclohexyl peroxy dicarbonate | Chlorobenzene | 3.20 | |
| Do | 1.0 | 1.85 | $Cl_2$, 1.5 | Irradiation | Carbon-tetrachloride | 2.61 | |
| Linear poly(vinyltoluene) | 0.5 | 0 | $SO_2Cl_2$, 0.55 | AIBN | do | 4.2 | |
| Do | 0.5 | 0 | $Cl_2$, 0.5 | Irradiation | do | 3.3 | |

What is claimed is:

1. In the process of chlorinating the pendant methyl groups of a crosslinked vinyl aromatic polymer contain- 15. In a process of preparing an aminated linear vinyl aromatic polymer which comprises (A) chlorinating the pendant methyl groups of a linear vinyl aromatic polymer containing pendant methyl groups and (B) aminating the product of step (A), the improvement which comprises performing the chlorination with an excess of sulfuryl chloride in the presence of a free radical catalyst at a temperature in the range of about 5° C. to about 80° C., thereby chlorinating and converting said pendant methyl groups into chloromethyl groups.

References Cited

UNITED STATES PATENTS 3,425,990  2/1969  Corte et al. _____ 260—67.6

FOREIGN PATENTS 1,150,496  1/1958  France.
6414948  6/1965  Netherlands.

OTHER REFERENCES

Itkina et al.: *Sin. Svoistva Ionoobmen. Mater.* 1968, 13–17.

Davankov et al.: *Vysokomolekul. Soedin.* 5, 1457–60 (1963).

*Kirk-Othmer Encycl. Chem. Technol.* 5, 402–403 (1964).

MELVIN GOLDSTEIN, Primary Examiner

U.S. Cl. X.R.

260—93.5 A

UNITED STATES PATENT OFFICE
CERTIFICATE OF CORRECTION

Patent No. 3,812,061        Dated  May 21, 1974

Inventor(s)  James H. Barrett

It is certified that error appears in the above-identified patent and that said Letters Patent are hereby corrected as shown below:

IN THE SPECIFICATION:

Col. 1, lines 57-65, formula should be --

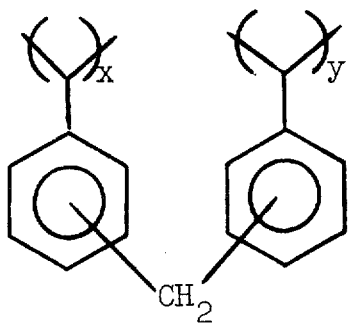

Col. 3, line 1, "zoid" should read --zoyl-- .
Col. 4, line 7, "2.7 Cl" should read --2.7% Cl-- .
Columns 5 and 6, Table I., under heading Catalyst, "Lauryl" should read --Lauroyl-- .

IN THE CLAIMS:

Col. 6, line 9, "is" should be deleted.

UNITED STATES PATENT OFFICE
CERTIFICATE OF CORRECTION

Patent No. 3,812,061     Dated    May 21, 1974

Inventor(s)  James H. Barrett

It is certified that error appears in the above-identified patent and that said Letters Patent are hereby corrected as shown below:

IN THE SPECIFICATION:

Col. 1, lines 36-37, "with chloromethylation of an appropriate aromatic polymer" should be deleted.

Col. 3, line 1, "axobisbutyronitrile" should read -- azobisbutyronitrile-- .

Col. 3, line 62, "poly(vinyltoluene-1.85%" should read -- poly(vinyltoluene)-1.85%-- .

Signed and sealed this 8th day of October 1974.

(SEAL)
Attest:

McCOY M. GIBSON JR.
Attesting Officer

C. MARSHALL DANN
Commissioner of Patents